US012571226B2

(12) United States Patent
Chen

(10) Patent No.: US 12,571,226 B2
(45) Date of Patent: Mar. 10, 2026

(54) SUCTION POOL CLEANER

(71) Applicant: NINGBO POOLSTAR POOL PRODUCTS CO., LTD., Ningbo (CN)

(72) Inventor: Liang Chen, Ningbo (CN)

(73) Assignee: NINGBO POOLSTAR POOL PRODUCTS CO., LTD., Ningbo (CN)

( * ) Notice: Subject to any disclaimer, the term of this patent is extended or adjusted under 35 U.S.C. 154(b) by 355 days.

(21) Appl. No.: 18/451,758

(22) Filed: Aug. 17, 2023

(65) Prior Publication Data

US 2023/0392402 A1     Dec. 7, 2023

(30) Foreign Application Priority Data

Mar. 22, 2023     (CN) .......................... 202320568235.5

(51) Int. Cl.
*E04H 4/16*          (2006.01)
*C02F 1/00*          (2023.01)
*C02F 103/42*          (2006.01)

(52) U.S. Cl.
CPC ........... *E04H 4/1636* (2013.01); *C02F 1/001* (2013.01); *C02F 2103/42* (2013.01)

(58) Field of Classification Search
None
See application file for complete search history.

(56) References Cited

U.S. PATENT DOCUMENTS

| | | | | | |
|---|---|---|---|---|---|
| 3,075,227 | A | * | 1/1963 | Bowles | ...................... A47L 5/28 |
| | | | | | 116/DIG. 18 |
| 3,790,979 | A | * | 2/1974 | Foster | ................... E04H 4/1654 |
| | | | | | 15/387 |
| 3,794,052 | A | * | 2/1974 | Koble, Jr. | ............. E04H 4/1681 |
| | | | | | 210/167.16 |
| 3,961,393 | A | * | 6/1976 | Pansini | ................. E04H 4/1618 |
| | | | | | 15/1.7 |
| 4,052,950 | A | * | 10/1977 | Hirata | ..................... B63B 59/10 |
| | | | | | 15/385 |
| 4,168,557 | A | * | 9/1979 | Rasch | ................... E04H 4/1654 |
| | | | | | 15/1.7 |
| 4,558,479 | A | * | 12/1985 | Greskovics | ........... E04H 4/1654 |
| | | | | | 55/374 |
| 4,589,986 | A | * | 5/1986 | Greskovics | ........... E04H 4/1654 |
| | | | | | 55/374 |

(Continued)

FOREIGN PATENT DOCUMENTS

| | | | | | |
|---|---|---|---|---|---|
| AU | 2023229508 A1 | * | 10/2024 | ............. | C02F 1/001 |
| AU | 2023229508 B2 | * | 1/2025 | ............. | C02F 1/001 |

(Continued)

*Primary Examiner* — Robert J Popovics

(57) ABSTRACT

A suction pool cleaner, including a housing, an impeller, a driving member, a first baffle plate and a second baffle plate. The housing has a water inlet and a water outlet. The impeller is located in the housing between the inlet and the outlet. The driving member includes a main body and a drive shaft arranged thereon. The impeller is sleeved on the drive shaft, and the driving member drives the impeller to rotate around the drive shaft to generate a suction force. The first baffle plate is located in the housing between the impeller and the inlet, and an axis of the drive shaft passes through the first baffle plate. One end of the second baffle plate is connected to an end of the impeller near the main body, and the other end is adjacent to the main body.

16 Claims, 5 Drawing Sheets

(56) References Cited

U.S. PATENT DOCUMENTS

| | | | | | |
|---|---|---|---|---|---|
| 5,317,776 | A * | 6/1994 | DeMoura | E04H 4/1636 | 15/350 |
| 5,569,371 | A * | 10/1996 | Perling | G05D 1/646 | 210/167.16 |
| 5,768,734 | A * | 6/1998 | Dietrich | E04H 4/1618 | 210/167.17 |
| 6,115,864 | A * | 9/2000 | Davidsson | E04H 4/1654 | 15/1.7 |
| 6,409,916 | B1 * | 6/2002 | Zelas | E04H 4/1654 | 210/167.16 |
| 6,412,133 | B1 * | 7/2002 | Erlich | E04H 4/1663 | 15/1.7 |
| 6,473,927 | B1 * | 11/2002 | Sommer | E04H 4/1654 | 210/167.16 |
| 6,539,573 | B1 * | 4/2003 | Caccavella | E04H 4/1654 | 15/1.7 |
| 6,740,233 | B2 * | 5/2004 | Stoltz | A47L 9/1427 | 210/232 |
| 6,842,931 | B2 * | 1/2005 | Porat | E04H 4/1654 | 15/1.7 |
| 6,886,205 | B1 * | 5/2005 | Pichon | E04H 4/1654 | 15/1.7 |
| 6,942,790 | B1 * | 9/2005 | Dolton | E04H 4/1636 | 210/167.16 |
| 6,954,960 | B2 * | 10/2005 | Pichon | E04H 4/1654 | 15/49.1 |
| 6,965,814 | B2 * | 11/2005 | Hadari | E04H 4/1654 | 210/167.16 |
| 6,971,136 | B2 * | 12/2005 | Horvath | E04H 4/1654 | 210/167.17 |
| 7,117,554 | B2 * | 10/2006 | Pichon | E04H 4/1654 | 15/50.3 |
| 7,165,284 | B2 * | 1/2007 | Erlich | E04H 4/1654 | 134/18 |
| 7,316,751 | B2 * | 1/2008 | Horvath | E04H 4/1654 | 210/167.17 |
| 7,621,014 | B2 * | 11/2009 | Katz | E04H 4/1654 | 15/319 |
| 7,690,066 | B2 * | 4/2010 | Stoltz | E04H 4/1636 | 15/1.7 |
| 7,827,643 | B2 * | 11/2010 | Erlich | E04H 4/1654 | 15/1.7 |
| 7,900,308 | B2 * | 3/2011 | Erlich | E04H 4/1663 | 15/1.7 |
| 8,007,653 | B2 * | 8/2011 | Porat | E04H 4/1654 | 205/744 |
| 8,221,620 | B2 * | 7/2012 | Dietrich | E04H 4/1636 | 210/232 |
| 8,273,183 | B2 * | 9/2012 | Erlich | E04H 4/1663 | 134/6 |
| 8,307,484 | B2 * | 11/2012 | Porat | E04H 4/1281 | 204/229.4 |
| 8,632,677 | B2 * | 1/2014 | Sherman | A01K 63/10 | 210/242.1 |
| 9,453,355 | B1 * | 9/2016 | Rasp | E04H 4/1645 | |
| 9,546,493 | B2 * | 1/2017 | Chen | E04H 4/1636 | |
| 9,828,785 | B2 * | 11/2017 | Heffernan | E04H 4/1618 | |
| 9,963,896 | B2 * | 5/2018 | Heffernan | E04H 4/1618 | |
| 10,094,130 | B2 * | 10/2018 | Erlich | E04H 4/1636 | |
| 10,184,259 | B2 * | 1/2019 | Fränkel | E04H 4/1654 | |
| 10,224,839 | B2 * | 3/2019 | Dietrich | E04H 4/1636 | |
| 10,494,828 | B2 * | 12/2019 | Turjeman | F04D 13/086 | |
| 10,704,282 | B2 * | 7/2020 | Dufilho | E04H 4/1636 | |
| 10,895,086 | B2 * | 1/2021 | Roumagnac | E04H 4/1654 | |
| 11,053,701 | B2 * | 7/2021 | Erlich | E04H 4/1636 | |
| 11,091,925 | B2 * | 8/2021 | Erlich | E04H 4/1636 | |
| 11,313,378 | B2 * | 4/2022 | Chen | E04H 4/1654 | |
| 11,519,192 | B2 * | 12/2022 | Bruneel | E04H 4/1672 | |
| 11,725,410 | B2 * | 8/2023 | Chen | E04H 4/16 | 15/1.7 |
| 11,781,334 | B1 * | 10/2023 | Sarpolis | E04H 4/1636 | 210/167.16 |

| | | | | | |
|---|---|---|---|---|---|
| 2002/0129839 | A1 * | 9/2002 | Erlich | E04H 4/1663 | 134/22.18 |
| 2004/0025269 | A1 * | 2/2004 | Pichon | E04H 4/1654 | 15/1.7 |
| 2004/0045104 | A1 * | 3/2004 | Pichon | E04H 4/1654 | 15/1.7 |
| 2004/0074524 | A1 * | 4/2004 | Horvath | E04H 4/1654 | 134/10 |
| 2004/0168838 | A1 * | 9/2004 | Erlich | E04H 4/1663 | 180/21 |
| 2006/0048312 | A1 * | 3/2006 | Horvath | E04H 4/1654 | 15/1.7 |
| 2007/0028405 | A1 * | 2/2007 | Garti | E04H 4/1654 | 15/1.7 |
| 2007/0094817 | A1 * | 5/2007 | Stoltz | E04H 4/1636 | 15/1.7 |
| 2007/0101521 | A1 * | 5/2007 | Erlich | E04H 4/1663 | 15/1.7 |
| 2007/0251032 | A1 * | 11/2007 | Pichon | E04H 4/1654 | 15/1.7 |
| 2008/0078039 | A1 * | 4/2008 | Katz | E04H 4/1654 | 15/1.7 |
| 2008/0189885 | A1 * | 8/2008 | Erlich | E04H 4/1654 | 15/1.7 |
| 2008/0222821 | A1 * | 9/2008 | Pichon | E04H 4/1654 | 475/5 |
| 2008/0235887 | A1 * | 10/2008 | Horvath | E04H 4/1654 | 15/1.7 |
| 2008/0236628 | A1 * | 10/2008 | Horvath | E04H 4/1654 | 134/21 |
| 2008/0313827 | A1 * | 12/2008 | Paxton | E04H 4/1636 | 15/1.7 |
| 2009/0094765 | A1 * | 4/2009 | Osaka | B08B 3/024 | 15/1.7 |
| 2009/0282627 | A1 * | 11/2009 | Porat | G06Q 20/3255 | 204/229.4 |
| 2011/0056031 | A1 * | 3/2011 | Erlich | E04H 4/1654 | 15/1.7 |
| 2011/0203980 | A1 * | 8/2011 | Dietrich | E04H 4/1636 | 210/167.17 |
| 2011/0271983 | A1 * | 11/2011 | Erlich | E04H 4/1654 | 134/10 |
| 2012/0273004 | A1 * | 11/2012 | Erlich | E04H 4/1663 | 134/10 |
| 2015/0128361 | A1 * | 5/2015 | Erlich | E04H 4/1636 | 15/1.7 |
| 2015/0197951 | A1 * | 7/2015 | Erlich | E04H 4/1654 | 15/1.7 |
| 2015/0197952 | A1 * | 7/2015 | Erlich | E04H 4/1663 | 15/1.7 |
| 2016/0032604 | A1 * | 2/2016 | Chen | E04H 4/1636 | 210/167.16 |
| 2016/0237709 | A1 * | 8/2016 | Dietrich | E04H 4/1636 | |
| 2019/0040867 | A1 * | 2/2019 | Chen | F03B 3/10 | |
| 2020/0061502 | A1 * | 2/2020 | Erlich | B01D 29/15 | |
| 2021/0108650 | A1 * | 4/2021 | Chen | F04D 1/00 | |
| 2021/0164252 | A1 * | 6/2021 | Bruneel | E04H 4/1636 | |
| 2022/0018149 | A1 * | 1/2022 | Chen | E04H 4/16 | |
| 2022/0136518 | A1 * | 5/2022 | Dietrich | E04H 4/1636 | 416/54 |
| 2023/0160227 | A1 * | 5/2023 | Bruneel | E04H 4/1636 | 15/1.7 |
| 2023/0392402 | A1 * | 12/2023 | Chen | E04H 4/1636 | |
| 2024/0122429 | A1 * | 4/2024 | Chen | A47L 11/4066 | |
| 2024/0138382 | A1 * | 5/2024 | Park | B01D 29/114 | |
| 2025/0311905 | A1 * | 10/2025 | Roumagnac | A47L 9/1454 | |

FOREIGN PATENT DOCUMENTS

| | | | | |
|---|---|---|---|---|
| CN | 105723038 A | | 6/2016 | |
| CN | 112983063 A | | 6/2021 | |
| ES | 1305102 U | * | 1/2024 | E04H 4/1618 |
| FR | 3146923 A3 | * | 9/2024 | C02F 1/001 |

* cited by examiner

700

112

100

SUCTION POOL CLEANER

CROSS-REFERENCE TO RELATED APPLICATIONS

This application claims the benefit of priority from Chinese Patent Application No. 202320568235.5, filed on Mar. 22, 2023. The content of the aforementioned application, including any intervening amendments thereto, is incorporated herein by reference in its entirety.

TECHNICAL FIELD

This application relates to cleaning equipment for swimming pools and other artificial pools, in particular to a suction pool cleaner.

BACKGROUND

In the existing suction pool cleaners, the drive shaft drives the impeller to rotate to generate a suction force, so as to suck the water together with debris and dirt from the water inlet, and the water is discharged from the water outlet after being filtered. However, during the suction process, leaves and strip-shaped debris may be twisted on the drive shaft, which will slow down the rotating speed of the driving member and further affect the cleaning efficiency.

SUMMARY

Based on this, a main purpose of this application is to provide a suction pool cleaner that can prevent the motor shaft from being entangled with debris to ensure a high and stable suction efficiency.

To achieve the above object, this application provides a suction pool cleaner, comprising:

a housing;

an impeller;

a driving member;

a first baffle plate; and a second baffle plate;

wherein the housing is provided with a water inlet and a water outlet;

the impeller is provided in the housing, and is located between the water inlet and the water outlet;

the driving member comprises a main body and a drive shaft arranged on the main body; the impeller is sleeved on the drive shaft; and the driving member is configured to drive the impeller through the drive shaft to rotate around an axis of the drive shaft to generate a suction force;

the first baffle plate is provided in the housing and is located between the impeller and the water inlet; and the axis of the drive shaft passes through the first baffle plate; and a first end of the second baffle plate is connected to an end of the impeller near the main body, and a second end of the second baffle plate is adjacent to the main body.

In some embodiments, the suction pool cleaner further comprises a connecting member; a first end of the connecting member is connected to the first baffle plate, and a second end of the connecting member is connected to an internal wall of the housing.

In some embodiments, the connecting member is integrally molded with the first baffle plate.

In some embodiments, a peripheral contour of the first baffle plate is a curved surface that narrows from an end close to the impeller to an end away from the impeller.

In some embodiments, the first baffle plate is a rotary body, and the axis of the drive shaft coincides with an axis of the first baffle plate.

In some embodiments, the second baffle plate is an elastic baffle plate or a rigid baffle plate.

In some embodiments, the impeller comprises an impeller column and a vane; the impeller column is sleeved on the drive shaft; the vane is spirally arranged on the impeller column; and the second baffle plate is connected to an end of the vane adjacent to the main body.

In some embodiments, the second baffle plate is configured to extend from the end of the vane adjacent to the main body towards the main body; an extension direction of the second baffle plate is parallel to the axis of the drive shaft.

In some embodiments, the suction pool cleaner further comprises a filter; and the filter is arranged between the water inlet and the water outlet, or the filter is arranged at an end of the water outlet away from the water inlet.

This application further provides another suction pool cleaner, comprising:

a housing;

an inner casing;

an impeller; and a driving member;

wherein the housing is provided with a water inlet and a water outlet;

the inner casing is arranged in the housing, and is configured to divide an interior of the housing into a suction chamber and a motor chamber; the motor chamber is not provided in the suction chamber; and the water inlet and the water outlet are both communicated with the suction chamber;

the impeller is provided in the suction chamber, and is located between the water inlet and the water outlet; and the driving member comprises a main body and a drive shaft arranged on the main body; the impeller is sleeved on the drive shaft; the driving member is configured to drive the impeller through the drive shaft to rotate around an axis of the drive shaft to generate a suction force; the main body is provided in the motor chamber; and the drive shaft penetrates the inner casing and partially extends into the suction chamber.

The advantages of the technical solutions of this application are described as follows. The driving member is configured to drive the impeller through the drive shaft to rotate around the axis of the drive shaft to generate a suction force, so that the water near the water inlet will be sucked into the housing through the water inlet. The water entering the housing is treated and then discharged through the water outlet. This application is provided with a first baffle plate, so that the water will impact on the first baffle plate after entering the housing through the water inlet, and will be spread into the housing from sides of the first baffle plate. Since the axis of the drive shaft passes through the first baffle plate, the end of the drive shaft near the first baffle plate is covered by the first baffle plate, so that the debris (e.g., leaves and strip-shaped debris) will not entangle the end of the drive shaft near the first baffle plate, thereby avoiding the reduction of the rotating speed of the driving member and ensuring the suction efficiency. This application is also provided with a second baffle plate, and the end of the second baffle plate not connected to the impeller is adjacent to the main body, so that a gap between the second baffle plate and the main body is relatively narrow. Therefore, when the water is flowing in the housing, it is difficult for the debris to wind around the end of the drive shaft connected to the main body through the gap between the second baffle plate and the main body, so that it avoids the drive shaft from being entangled by a large number of leaves or strips, thereby avoiding the reduction of the rotating speed of the driving member and ensuring the suction efficiency. By means of the first baffle plate and the second baffle plate, it can prevent the end of the drive shaft near the first baffle plate and the end of the drive shaft near the second baffle plate from being entangled by the leaves or strips as far as possible, so that the debris will not affect the operation of the drive shaft, enabling the continuous, stable and efficient pool cleaning.

BRIEF DESCRIPTION OF THE DRAWINGS

In order to illustrate the technical solutions in the embodiments or the prior art of this application more clearly, the accompanying drawings required in the description of the embodiments or prior art will be briefly introduced below. Obviously, presented in the drawings are only some embodiments of this application, and for those skilled in the art, other drawings can be obtained according to these drawings without making creative effort.

Figure 1:
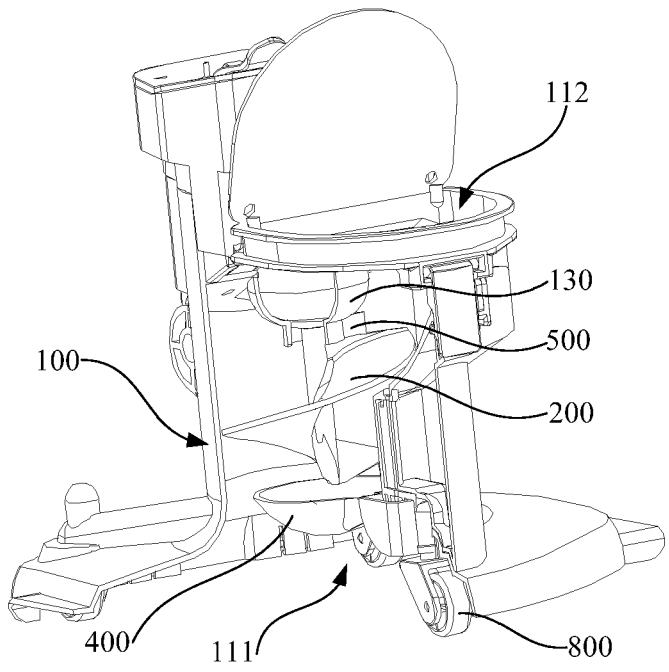
FIG. 1 is a structural diagram of a suction pool cleaner according to one embodiment of the disclosure.

In the drawings, 100—housing; 110—suction chamber; 111—water inlet; 112—water outlet; 120—motor chamber; 130—inner casing; 200 is impeller; 210—impeller column; 220—vane; 300—driving member; 310—main body; 320—drive shaft; 400—first baffle plate; 500—second baffle plate; 600—power supply member; 700—filter; 800—rotating wheel; 900—connecting member; and 1000—sealing member.

The purpose, functional features and advantages of this application will be further described in conjunction with the embodiments and the attached drawings.

DETAILED DESCRIPTION OF EMBODIMENTS

The technical solutions in the embodiments will be clearly and completely described below in conjunction with the attached drawings. Obviously, the described embodiments are only some instead of all embodiments of this application. Based on these embodiments, all other embodiments obtained by those skilled in the art without making creative effort shall fall within the protection scope of this application.

It should be noted that all directional indications (such as up, down, left, right, forward, backward and etc.) in the embodiments are used only to explain the relative position relationship, movement, etc. between various parts in a particular posture (as shown in the attached drawing), and if the particular posture is changed, the directional indications are changed accordingly. Furthermore, the descriptions involving "first" and "second" in this application are merely for descriptive purposes, and are not to be understood as indicating or implying their relative importance or implicitly specifying the number of the indicated technical features. Thus, the features defined with "first" and "second" may explicitly or implicitly include at least one such feature. In addition, "and/or" throughout the application includes three solutions, for example, "A and/or B" includes technical solution A, technical solution B, and a combination thereof. In addition, the technical solutions in various embodiments can be combined with each other, but it must be on the basis of the fact that the combination can be implemented by those skilled in the art. If the combination of technical solutions appears to be contradictory or cannot be implemented, it should be considered that such combination of technical solutions does not exist and is not within the protection scope of this application.

Figure 2:
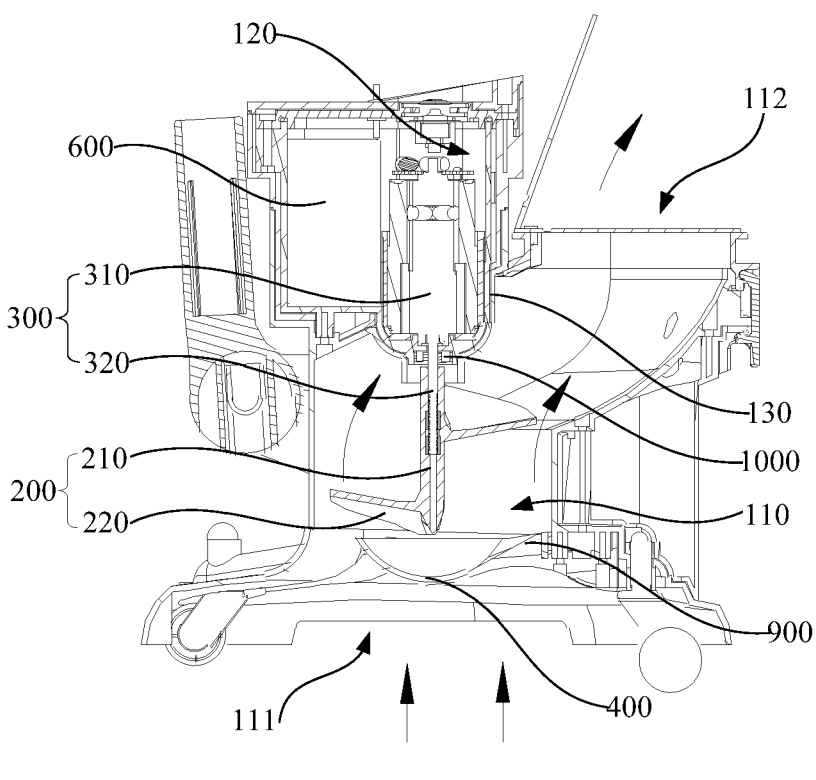
FIG. 2 shows a cross-sectional view of the suction pool cleaner according to one embodiment of the disclosure.
Figure 3:
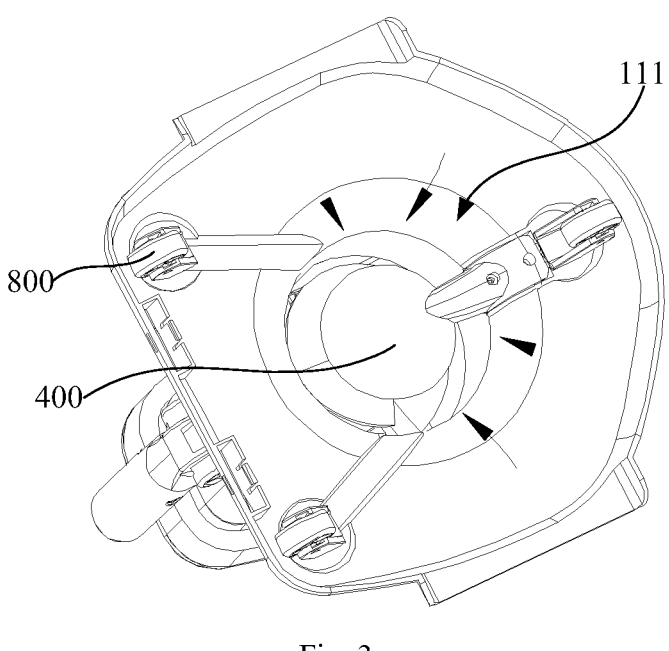
FIG. 3 is a structural diagram of the suction pool cleaner of according to one embodiment of the disclosure from another angle.

As shown in FIGS. 1-3, the present application provides a suction pool cleaner, including a housing 100, an impeller 200, a driving member 300, a first baffle plate 400 and a second baffle plate 500. The housing 100 is provided with a water inlet 111 and a water outlet 112. The impeller 200 is provided in the housing 100, and is located between the water inlet 111 and the water outlet 112. The driving member 300 includes a main body 310 and a drive shaft 320 arranged on the main body 310. Since the impeller 200 is sleeved on the drive shaft 320, the driving member 300 can drive the impeller 200 to rotate around the axis of the drive shaft 320 to generate a suction force. The first baffle plate 400 is provided in the housing 100, and is located between the impeller 200 and the water inlet 111, and the axis of the drive shaft 320 passes through the first baffle plate 400. A first end of the second baffle plate 500 is connected to the end of the impeller 200 near the main body 310, and a second end of the second baffle plate 500 is adjacent to the main body 310.

The driving member 300 is configured to drive the impeller 200 through the drive shaft 320 to rotate around the axis of the drive shaft 320 to generate the suction force, so as to drive the water near the inlet 111 to enter the housing 100 through the water inlet 111. The water entering the housing 100 is treated and then discharged through the water outlet 112. The first baffle plate 400 is provided so that when entering the housing 100 through the water inlet 111, the water will impact on the first baffle plate 400 and be spread into the housing 100 from the sides of the first baffle plate 400. Since the axis of the drive shaft 320 passes through the first baffle plate 400, the first baffle plate 400 protects the end of the drive shaft 320 near the first baffle plate 400 from being entangled with the debris (e.g., leaves or strip-shaped debris) and slowing down the rotating speed of the driving member 300 to ensure the suction efficiency. The present application is provided with a second baffle plate 500, and the second end of the second baffle plate 500 is not connected to the impeller 200, and is adjacent to the main body 310. Therefore, the gap between the second baffle plate 500 and the main body 310 is narrow so that when the water flows in the housing 100, the debris in the water is difficult to entangle the end of the drive shaft 320 connected to the main body 310 through the gap between the second baffle plate 500 and the main body 310. This avoids a large number of leaves or strips from entangling the drive shaft 320 and the reduction of the rotating speed of the driving member 300, thus ensuring the suction efficiency. This application provides both the first baffle plate 400 and the second baffle plate 500 to prevent the leaves or strips of garbage in the water from entangling the end of the drive shaft 320 near the first baffle plate 400 and the end of the drive shaft 320 near the second baffle plate 500 as far as possible. It ensures that the debris will not affect the operation of the drive shaft, and enables the continuous, stable and efficient pool cleaning.

In this embodiment, the second end of the second baffle plate 500 is not connected to the impeller 200, and is adjacent to the main body 310, such that the gap between the second baffle plate 500 and the main body 310 is narrow enough to avoid overly interference and friction between the second baffle plate 500 provided on the impeller 200 and the main body 310 when the impeller 200 is rotating. And the gap between the second baffle plate 500 and the main body 310 is arranged quite narrow to avoid a large amount of garbage in the water passing through the gap and entangling the drive shaft 320 between the second baffle plate 500 and the main body 310 as far as possible, so that the debris entangles the second baffle plate 500 but does not affect the operation of the drive shaft 320.

Referring to FIG. 2, in this embodiment, the driving member 300 is a motor, and the drive shaft 320 is a motor shaft.

Referring to FIG. 2, the suction pool cleaner further includes a power supply member 600. The power supply member 600 is electrically connected to the driving member 300.

Figure 4:
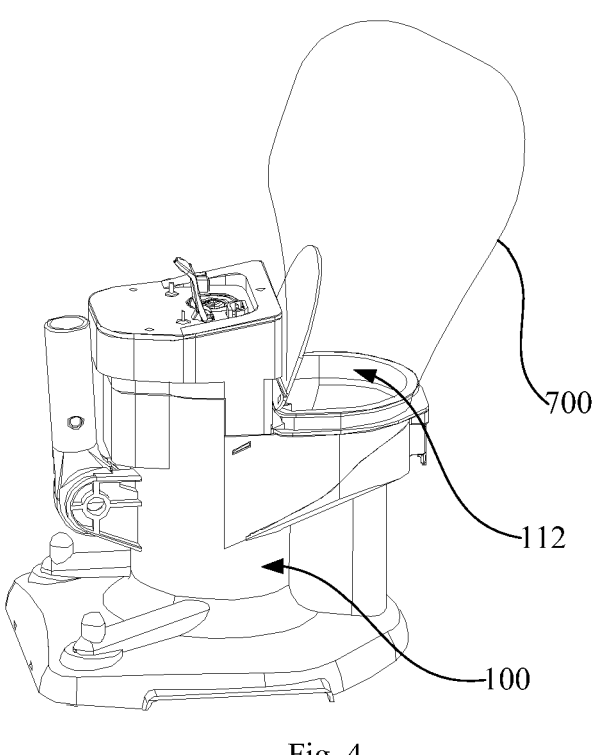
FIG. 4 is another structural diagram of the suction pool cleaner according to one embodiment of the disclosure.

Referring to FIG. 4, the suction pool cleaner further includes a filter 700. The filter 700 is provided between the water inlet 111 and the water outlet 112, or is provided at the end of the water outlet 112 away from the water inlet 111. Specifically, when the filter 700 is provided between the water inlet 111 and the water outlet 112, the water near the water inlet 111 enters the housing 100 via the water inlet 111 under the suction force generated by the impeller 200. Then the water entering the housing 100 is filtered and treated by the filter 700 to obtain the clean water, which is discharged from the water outlet 112. When the filter 700 is provided at the end of the water outlet 112 away from the water inlet 111, the water near the water inlet 111 enters the housing 100 via the water inlet 111 under the suction force generated by the impeller 200, and then flows into the filter 700 via the water outlet 112. And it is filtered and treated by the filter 700 to obtain the clean water, which is discharged from the filter 700.

Referring to FIG. 4, the filter 700 is a filtering screen and the filtering screen is connected to the end of the water outlet 112 away from the water inlet 111. Specifically, the water near the water inlet 111 enters the housing 100 through the water inlet 111 under the suction force generated by the impeller 200, and then flows into the filtering screen through the water outlet 112. And the solids, such as dirt and debris are caught in the filtering screen, while the purified water separated from the water entering the cleaner flows out of the mesh holes of the filtering screen.

The suction pool cleaner of this application is applied in swimming pools or other artificial pools to clean the pool water.

Referring to FIGS. 1 and 3, the water inlet 111 is arranged at the bottom of the housing 100 and the water outlet 112 is arranged at the top of the housing 100.

Referring to FIG. 2, the suction pool cleaner further includes a connecting member 900. One end of the connecting member 900 is connected to the first baffle plate 400, and the other end of the connecting member 900 is connected to the internal wall of the housing 100.

The connecting member 900 is integrally molded with the first baffle plate 400. Specifically, the connecting member 900 is fixedly connected to the internal wall of the housing 100 via a screw or an elastic buckle.

Figure 5:
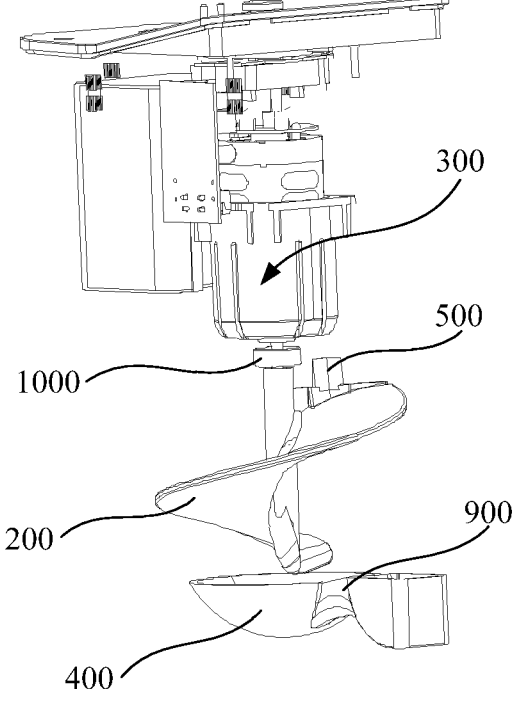
FIG. 5 is a partial structural diagram of the suction pool cleaner according to one embodiment of the disclosure.

Referring to FIGS. 2 and 5, the number of the connecting member 900 is one, and the connecting member 900 is connected to one end of the first baffle plate 400. As shown in FIG. 2, the connecting member 900 is connected to the right end of the first baffle plate 400. Specifically, the reasonable thickness and width of the connecting member 900 ensures the firm connection of the connecting member 900 to the first baffle plate 400.

Referring to FIGS. 1-2, the peripheral contour of the first baffle plate 400 is a curved surface gradually narrowing from the end close to the impeller 200 to the end away from the impeller 200. Specifically, the end of the first baffle plate 400 away from the impeller 200 (the bottom end of the first baffle plate 400) has a relatively narrow periphery, while the end of the first baffle plate 400 close to the impeller 200 (the top end of the first baffle plate 400) has a relatively wide periphery. Therefore, when the water flows from the bottom end of the first baffle plate 400 towards the top end thereof, the water gradually spreads towards the sides of the first baffle plate 400. It ensures that when flowing towards the impeller 200, the water is farther away from the axis of the drive shaft 320, so as to avoid the debris in the water from entangling the end of the drive shaft 320 near the first baffle plate 400.

The first baffle plate 400 may be arranged to, but not limited to, be a hemispherical structure, a conical structure, or a parabolic structure. And in this embodiment, referring to FIG. 1, the first baffle plate 400 is a hemispherical structure.

Referring to FIG. 2, the first baffle plate 400 is a rotary body, and the axis of the drive shaft 320 coincides with the axis of the first baffle plate 400. Specifically, when flowing from the bottom end of the first baffle plate 400 towards the top end of the first baffle plate 400, the water spreads towards sides of the first baffle plate 400. Due to the coincidence of the axis of the drive shaft 320 and the axis of the first baffle plate 400, the water flowing from sides of the first baffle plate 400 is all farther away from the axis of the drive shaft 320.

The second baffle plate 500 is an elastic baffle plate or a rigid baffle plate. Specifically, when the second baffle plate 500 is an elastic baffle plate, soft friction occurs if the elastic baffle plate rubs directly or indirectly against the main body 310 due to an assembly error or the like. In this embodiment, the second baffle plate 500 is an elastic baffle plate.

Referring to FIGS. 1-2, the impeller 200 includes an impeller column 210 and a vane 220. The impeller column 210 is sleeved on the drive shaft 320 and the vane 220 is spirally arranged on the impeller column 210. And the second baffle plate 500 is connected to the end of the vane 220 adjacent to the main body 310; and specifically, the vane 220 is arranged spirally for the spirally upward conveyance of debris in the water.

Referring to FIGS. 1-2 and 5, the second baffle plate 500 has a plate-like structure and extends from the end of the vane 220 near the main body 310 towards the main body 310. The extension direction of the second baffle plate 500 is parallel to the axis of the drive shaft 320. And in this embodiment, the extension direction of the second baffle plate 500 refers to the height direction of the second baffle plate 500.

Referring to FIGS. 1-2, the housing 100 is provided with an inner casing 130. The inner casing 130 divides the interior of the housing 100 into a suction chamber 110 and a motor chamber 120, and the motor chamber 120 is not provided in the suction chamber 110. The main body 310 is provided in the motor chamber 120, and the drive shaft 320 penetrates the inner casing 130 and partially extends into the suction chamber 110. Besides, the water inlet 111 and the water outlet 112 are both communicated with the suction chamber 110. The second end of the second baffle plate 500 is adjacent to the inner casing 130. Specifically, the main body 310 of the driving member 300 is separated in the motor chamber 120 by the inner casing 130. The narrow gap previously mentioned between the second baffle plate 500 and the main body 310 actually means the gap between the second baffle plate 500 and the inner casing 130. The gap is configured narrow to avoid, as much as possible, that debris in the water passing through the gap and entangling the drive shaft 320 between the second baffle plate 500 and the inner casing 130. Since the motor chamber 120 is not provided in the suction chamber 110, the motor chamber 120 and the suction chamber 110 are independent of each other, thereby ensuring the smooth passage of the water with a large volume of the garbage through the suction chamber 110.

Referring to FIG. 2, the motor chamber 120 is located in the upper left portion within the housing 100, and the suction chamber 110 is configured to take up the other portion within the housing 100, whereby in this disclosure, the water outlet 112 is provided in parallel with the motor chamber 120. And the water near the water inlet 111 enters the suction chamber 110 via the water inlet 111 under the suction force generated by the impeller 200, and then flows out to the outside via the water outlet 112. That said, the water does not need to pass through the motor chamber 120 during the flow and will not be interfered by components such as the motor during the flow. Because of such, the large-volume garbage in the water passes through the suction chamber 110 smoothly. In addition, since the suction chamber 110 and the water outlet 112 are provided in parallel with the motor chamber 120, so that the size of the water outlet 112 can be designed to vary with the actual needs with no influence from the motor chamber 120.

Further, the shortest distance between the second end of the second baffle plate 500 and the inner casing 130 is not greater than 1 cm. In this case, the debris in the water can be prevented, as far as possible, from passing through the gap between the second baffle plate 500 and the inner casing 130 and entangling the drive shaft 320 between the second baffle plate 500 and the inner casing 130.

In this embodiment, the second end of the second baffle plate 500 has a shortest distance of 0.3-0.5 cm from the inner casing 130.

Specifically, the water in the vicinity of the water inlet 111 enters the suction chamber 110 through the water inlet 111 under the suction force generated by the impeller 200. Then the water in the suction chamber 110 flows into the filter screen through the water outlet 112, and the solids, such as dirt and debris are caught in the filter screen. The purified water flows out through the mesh holes of the filter screen.

In this embodiment, the power supply member 600 is provided in the motor chamber 120.

Referring to FIGS. 2 and 5, the drive shaft 320 is provided with a sealing member 1000, which is located between the drive shaft 320 and the inner casing 130. The sealing member 1000 is used to realize the sealing between the motor chamber 120 and the suction chamber 110, so as to avoid the water sucked into the suction chamber 110 from entering the motor chamber 120. In this embodiment, the sealing member 1000 is a sealing ring in an annular structure and the sealing ring is sleeved on the drive shaft 320. The inner wall of the sealing ring is in close contact with the outer wall of the drive shaft 320. The outer wall of the sealing ring is in close contact with the inner casing 130, so as to realize the sealing between the motor chamber 120 and the suction chamber 110. Referring to FIGS. 1 and 3, the suction pool cleaner further includes a rotating wheel 800 provided at the bottom of the housing 100. Specifically, the rotating wheel 800 realizes the movement of the suction pool cleaner.

Referring to FIG. 3, multiple rotating wheels 800 are provided. In this embodiment, three rotating wheels 800 are arranged spaced apart at the bottom of the housing 100 to provide reliable support for the housing 100 and a convenient transfer of the suction pool cleaner.

Further, the rotating wheels 800 are universal wheels.

Described above are only preferred embodiments of the disclosure, and are not intended to limit the scope of the disclosure. It should be noted that any changes, modifications and replacements made by those skilled in the art without departing from the spirit of the disclosure shall fall within the scope of the disclosure defined by the appended claims.

What is claimed is:

1. A suction pool cleaner, comprising:
   a housing (100) defining a hollow interior, including a water inlet (111) and a water outlet (112);
   a driving member (300) including a main body (310) and a drive shaft (320) arranged on the main body (310), the driving member is configured to rotate the drive shaft (320) around an axis;
   an impeller (200) rotatably disposed within the housing (100) between the water inlet (111) and the water outlet (112), and sleeved on the drive shaft (320) such that rotation of the drive shaft (320) causes the impeller (200) to rotate around the axis to generate a suction force that draws water in through the water inlet (111);
   a first baffle plate (400) disposed within the housing (100) between the impeller (200) and the water inlet (111); and
   a second baffle plate (500) having:
      a first end connected to, and vertically extending towards the main body (310) from an end of a vane (220) of the impeller (200), the extension direction is parallel to the axis of the drive shaft (320) and the second baffle plate (500) is laterally spaced therefrom; and
      a second end being adjacent to the main body (310).

2. The suction pool cleaner of claim 1, wherein the suction pool cleaner further comprises:
   a connecting member (900), wherein a first end of the connecting member is connected to the first baffle plate (400), and a second end of the connecting member is connected to an internal wall of the housing (100).

3. The suction pool cleaner of claim 2, wherein the connecting member (900) is integrally molded with the first baffle plate (400).

4. The suction pool cleaner of claim 1, wherein a peripheral contour of the first baffle plate (400) is a curved surface.

5. The suction pool cleaner of claim 4, wherein the first baffle plate (400) is a rotary body, and the axis of the drive shaft (320) coincides with an axis of the first baffle plate (400).

6. The suction pool cleaner of claim 4, wherein the first baffle plate (400) is a hemispherical structure.

7. The suction pool cleaner of claim 1, wherein the second baffle plate is an elastic baffle plate.

8. The suction pool cleaner of claim 1, wherein the second baffle plate is a rigid baffle plate.

9. The suction pool cleaner of claim 1, wherein the impeller (200) comprises an impeller column (210) sleeved on the drive shaft (320).

10. The suction pool cleaner of claim 9, wherein the vane (220) is spirally arranged on the impeller column (210).

11. The suction pool cleaner of claim 1, wherein the suction pool cleaner further comprises a filter (700) disposed between the water inlet (111) and the water outlet (112).

12. The suction pool cleaner of claim 1, wherein the suction pool cleaner further comprises a filter (700) arranged at an end of the water outlet (112).

13. The suction pool cleaner of claim 1, wherein the suction pool cleaner further comprises:

an inner casing (900), disposed within the housing (100), dividing the hollow interior of the housing (100) into a suction chamber (110) and a motor chamber (120).

14. The suction pool cleaner of claim 13, wherein the water inlet (111) and the water outlet (112) are both in fluid communication with the suction chamber (110).

15. The suction pool cleaner of claim 13, wherein the main body (310) is disposed within the motor chamber (120), and the drive shaft (320) penetrates the inner casing (900) and partially extends into the suction chamber (110).

16. The suction pool cleaner of claim 1, wherein the impeller (200) is disposed within the suction chamber (110).

* * * * *